United States Patent
You et al.

(10) Patent No.: US 12,142,196 B2
(45) Date of Patent: Nov. 12, 2024

(54) FLICKER REDUCTION DEVICE OF DISPLAY APPARATUS AND TILING DISPLAY APPARATUS INCLUDING THE SAME

(71) Applicant: LG Display Co., Ltd., Seoul (KR)

(72) Inventors: Dong Jun You, Paju-si (KR); Tae Gung Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/236,253

(22) Filed: Aug. 21, 2023

(65) Prior Publication Data

US 2024/0242660 A1 Jul. 18, 2024

(30) Foreign Application Priority Data

Jan. 13, 2023 (KR) .................. 10-2023-0005505

(51) Int. Cl.
*G09G 3/32* (2016.01)
*G09G 3/20* (2006.01)

(52) U.S. Cl.
CPC ............ *G09G 3/32* (2013.01); *G09G 3/2096* (2013.01); *G09G 2300/026* (2013.01); *G09G 2320/0247* (2013.01); *G09G 2360/04* (2013.01); *G09G 2360/06* (2013.01)

(58) Field of Classification Search
CPC ....... G09G 2360/04; G09G 2320/0247; G09G 2300/026; G09G 3/32; G09G 3/2096
See application file for complete search history.

(56) References Cited

U.S. PATENT DOCUMENTS

| 2015/0348509 | A1* | 12/2015 | Verbeure | H04N 9/3188 |
| | | | | 345/82 |
| 2019/0253662 | A1 | 8/2019 | Kim et al. | |
| 2020/0335062 | A1 | 10/2020 | Huard et al. | |
| 2022/0019397 | A1* | 1/2022 | Park | G09F 9/3026 |
| 2022/0208145 | A1* | 6/2022 | Glen | G06F 3/1446 |
| 2022/0343871 | A1* | 10/2022 | Huang | G09G 3/3618 |
| 2023/0030201 | A1* | 2/2023 | Youn | G09G 3/3406 |

* cited by examiner

*Primary Examiner* — Liliana Cerullo
(74) *Attorney, Agent, or Firm* — Birch, Stewart, Kolasch & Birch, LLP

(57) ABSTRACT

A flicker reduction device of a display apparatus can include a frame memory configured to store image data of an input frame synchronized with an input frame frequency, a first circuit configured to output a first control signal when a plurality of fixed active periods based on a reference frame frequency are allocated within each input frame time corresponding to the input frame frequency and output a second control signal when only one fixed active period is allocated within each input frame time, and a second circuit configured to copy the image data of the input frame according to the first control signal and output image data of a plurality of input frames according to the reference frame frequency. The second circuit outputs the image data of the input frame according to the reference frame frequency without copying according to the second control signal.

10 Claims, 14 Drawing Sheets

| FRAME FREQUENCY (Hz) | LUMINANCE (nit) |
|---|---|
| 144 | 36.78 |
| 120 | 37.61 |
| 100 | 38.3 |
| 80 | 38.93 |
| 60 | 39.59 |
| 40 | 40.23 |

FLICKER REDUCTION DEVICE OF DISPLAY APPARATUS AND TILING DISPLAY APPARATUS INCLUDING THE SAME

CROSS-REFERENCE TO RELATED APPLICATIONS

This application claims priority to Korean Patent Application No. 10-2023-0005505 filed in the Republic of Korea on Jan. 13, 2023, the entire contents of which are hereby expressly incorporated by reference into the present application.

BACKGROUND

Field

The present disclosure relates to a flicker reduction device of a display apparatus and a tiling display apparatus including the same.

Discussion of the Related Art

Display apparatuses can drive a display panel at various frame frequencies. A frame frequency can be referred to as a refresh rate or a scan rate.

However, in display apparatuses of the related art, luminance implemented in a display panel is changed based on an input frame frequency, and due to this, when the input frame frequency varies, there can be a limitation where flickers are recognized. Such a limitation can occur in tiling display apparatuses where one tiling screen is configured by connecting a plurality of display apparatuses with one another.

SUMMARY OF THE DISCLOSURE

To overcome or address the aforementioned limitations of the related art, the present disclosure can provide a flicker reduction device of a display apparatus and a tiling display apparatus including the same, in which an output frame frequency is fixed, and thus, the recognition or occurrence of flickers can be reduced even when an input frame frequency is changed over time.

To achieve these objects and other advantages and in accordance with the purpose of the disclosure, as embodied and broadly described herein, a flicker reduction device of a display apparatus according to an aspect of the present disclosure includes a frame memory configured to store image data of an input frame synchronized with an input frame frequency, a first circuit configured to output a first control signal when a plurality of fixed active periods based on a reference frame frequency are allocated within each input frame time corresponding to the input frame frequency and output a second control signal when only one fixed active period is allocated within each input frame time, and a second circuit configured to copy the image data of the input frame according to the first control signal and output image data of a plurality of input frames according to the reference frame frequency, and configured to output the image data of the input frame according to the reference frame frequency without copying according to the second control signal.

In another aspect of the present disclosure, a tiling display apparatus includes a plurality of display modules connected with one another to configure a tiling screen and divisionally display an input image and a flicker reduction device included in each of the plurality of display modules, wherein the flicker reduction device includes a frame memory configured to store image data of an input frame synchronized with an input frame frequency, a first circuit configured to output a first control signal when a plurality of fixed active periods based on a reference frame frequency are allocated within each input frame time corresponding to the input frame frequency and output a second control signal when only one fixed active period is allocated within each input frame time, and a second circuit configured to copy the image data of the input frame according to the first control signal and output image data of a plurality of input frames according to the reference frame frequency, and configured to output the image data of the input frame according to the reference frame frequency without copying according to the second control signal.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE EMBODIMENTS

Figure 1:
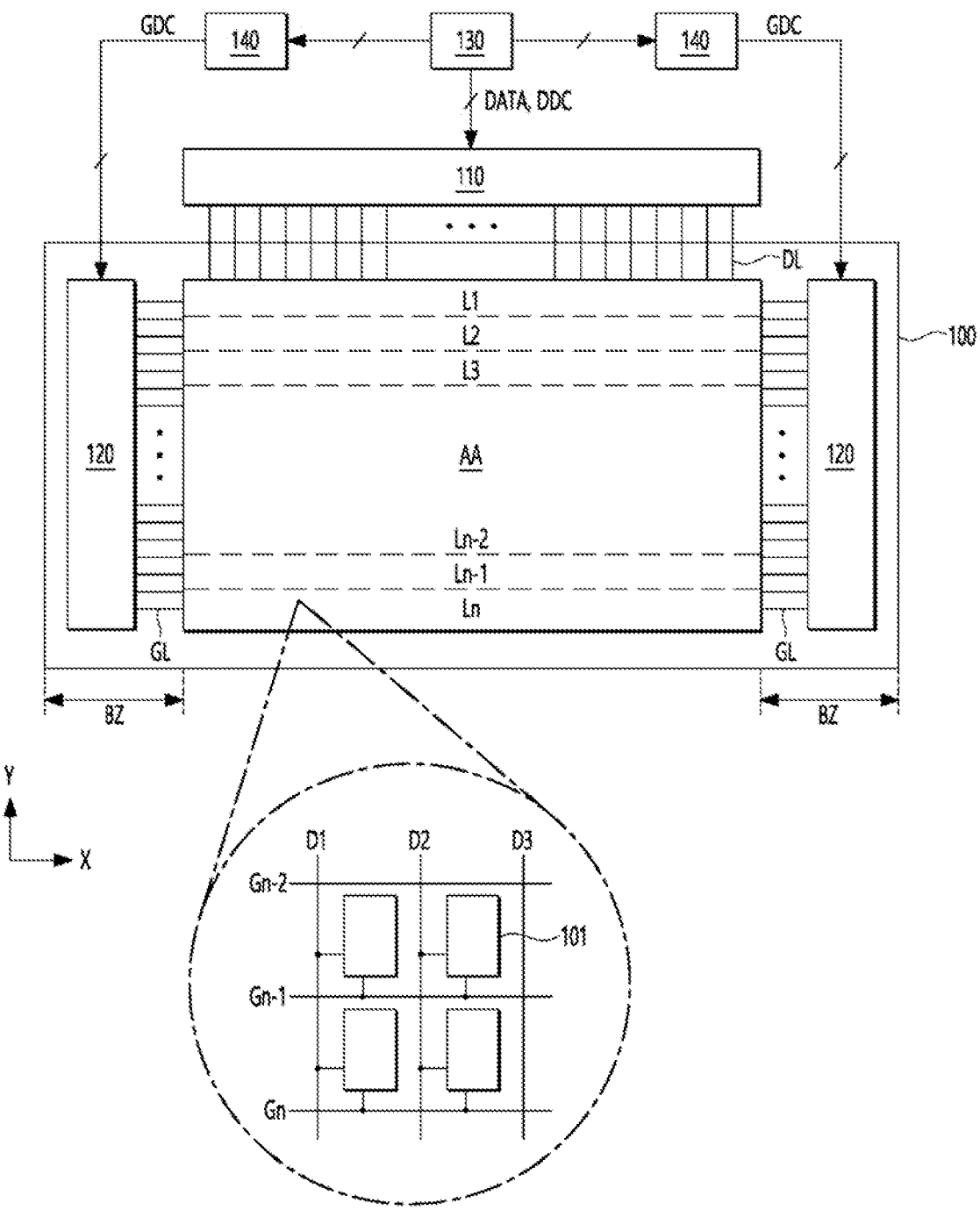
FIG. 1 is a block diagram illustrating a display apparatus according to an embodiment of the present disclosure.

Hereinafter, the present disclosure will be described more fully with reference to the accompanying drawings, in which exemplary embodiments of the disclosure are shown. The disclosure can, however, be embodied in many different forms and should not be construed as being limited to the embodiments set forth herein; rather, these embodiments are provided so that this disclosure will be thorough and complete, and will fully convey the concept of the disclosure to those skilled in the art.

Advantages and features of the present disclosure, and implementation methods thereof will be clarified through following embodiments described with reference to the accompanying drawings. The present disclosure can, however, be embodied in different forms and should not be construed as limited to the embodiments set forth herein. Rather, these embodiments are provided so that this disclosure will be thorough and complete, and will fully convey the scope of the present disclosure to those skilled in the art.

The shapes, sizes, ratios, angles, numbers and the like disclosed in the drawings for description of various embodiments of the present disclosure to describe embodiments of the present disclosure are merely exemplary and the present disclosure is not limited thereto. Like reference numerals refer to like elements throughout. Throughout this specification, the same elements are denoted by the same reference numerals. As used herein, the terms "comprise", "having," "including" and the like suggest that other parts can be added unless the term "only" is used. As used herein, the singular forms "a", "an", and "the" are intended to include the plural forms as well, unless context clearly indicates otherwise.

Elements in various embodiments of the present disclosure are to be interpreted as including margins of error even without explicit statements.

In describing a position relationship, for example, when a position relation between two parts is described as "on", "over", "under", and "next", one or more other parts can be disposed between the two parts unless "just" or "direct" is used.

It will be understood that, although the terms "first", "second", etc. can be used herein to describe various elements, these elements should not be limited by these terms. These terms are only used to distinguish one element from another and my not define order or sequence. For example, a first element could be termed a second element, and, similarly, a second element could be termed a first element, without departing from the scope of the present disclosure.

In the following description, when the detailed description of the relevant known function or configuration is determined to unnecessarily obscure the important point of the present disclosure, the detailed description will be omitted. Hereinafter, embodiments of the present disclosure will be described in detail with reference to the accompanying drawings. All the components of each display apparatus according to all embodiments of the present disclosure are operatively coupled and configured.

Figure 2:
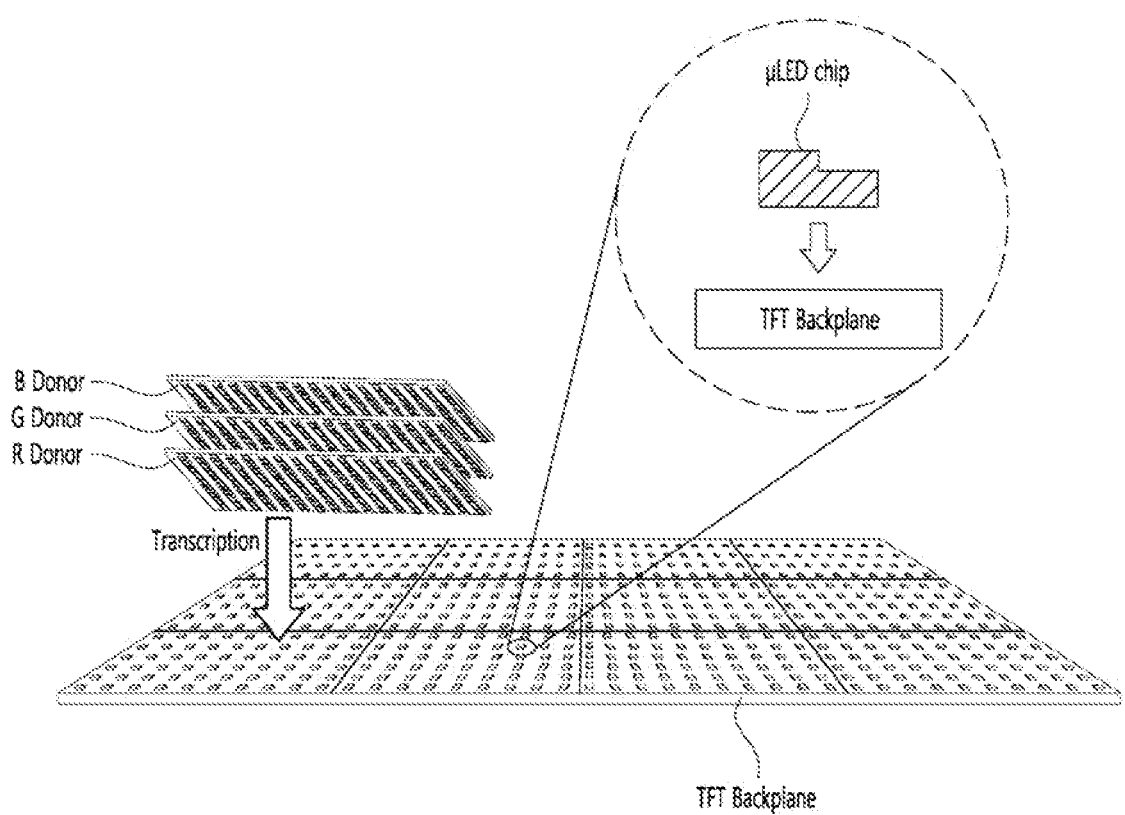
FIGS. 2 and 3 are diagrams illustrating a display panel based on a micro light emitting diode (micro LED)
Figure 3:
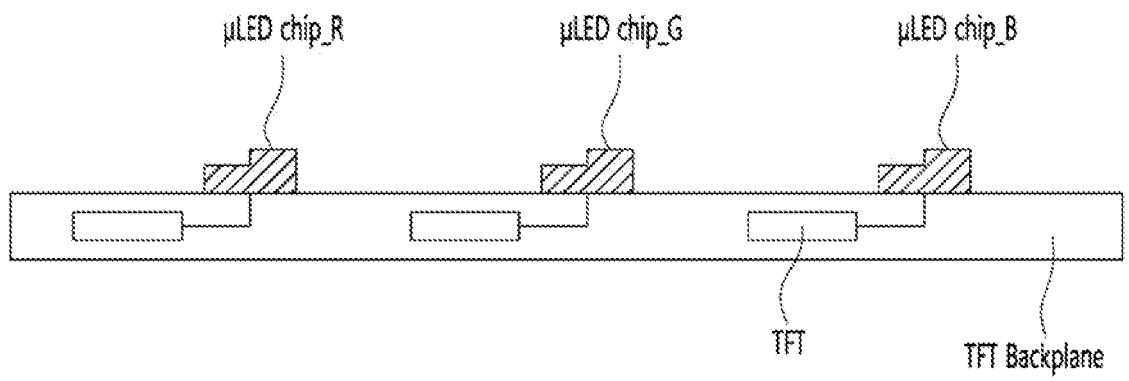

FIG. 1 is a block diagram illustrating a display apparatus according to an embodiment of the present disclosure. FIGS. 2 and 3 are diagrams illustrating a display panel based on a micro light emitting diode (micro LED).

Referring to FIG. 1, a display panel 100 can include a screen (active area) AA which reproduces an input image. The screen AA can include a pixel array which displays pixel data (hereinafter referred to as "image data") of an input image. The pixel array can include a plurality of data lines DL, a plurality of gate lines GL intersecting with the data lines DL, and a plurality of pixels 101.

The pixels 101 can be arranged on the screen AA in a matrix type defined by the data lines DL and the gate lines GL. The pixel 101 can be arranged as various types, such as a type which shares pixels emitting lights having the same color, a stripe type, and a diamond type as well as a matrix type, on the screen AA.

The pixel array can include a plurality of pixel columns and a plurality of pixel lines L1 to Ln intersecting with the pixel columns, where n can be a real number such as a positive integer. Each of the pixel columns can include pixels which are arranged in a Y-axis direction. A pixel line can include pixels which are arranged in an X-axis direction. One vertical period can be one frame period needed for writing image data DATA of one frame in all pixels of the screen. One horizontal period can be a time obtained by dividing one frame period by the number of pixel lines L1 to Ln. One horizontal period can be a time needed for writing the image data DATA of one pixel line, sharing a gate line GL, in pixels of one pixel line.

One frame period can include an active period where data voltages corresponding to the image data DATA are supplied to the pixels 101 and a blank period except the active period. In the blank period, data voltages may not be supplied to the pixels 101.

The pixels 101 can include a red (R) pixel, a green (G) pixel, and a blue (B) pixel for implementing colors.

Figure 4:
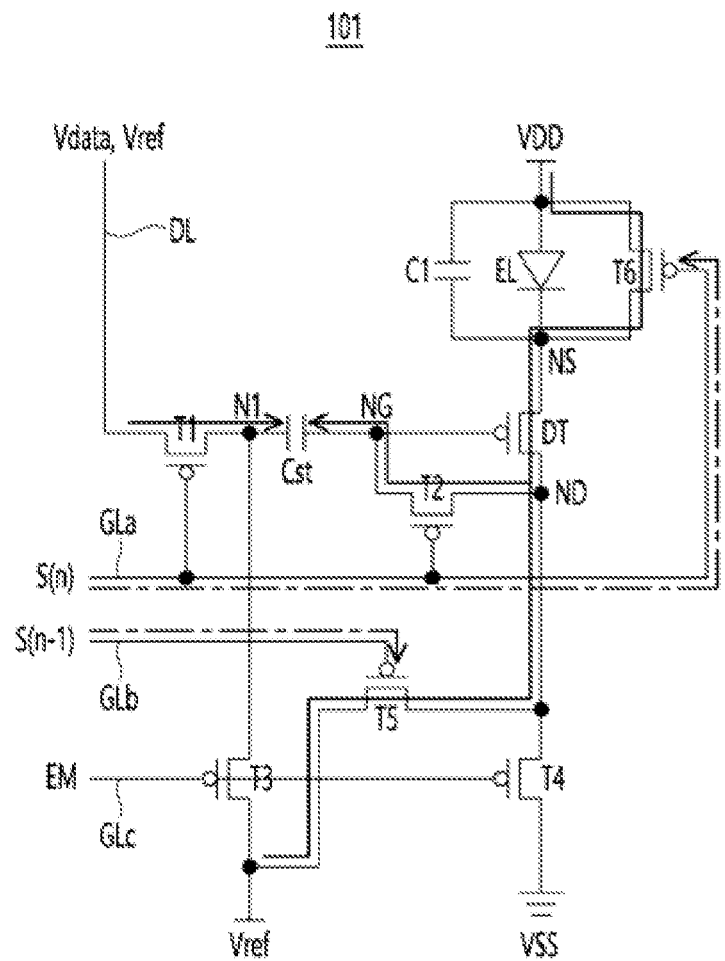
FIG. 4 is an equivalent circuit diagram of each pixel included in a display panel.

Each of the pixels 101, as in FIGS. 2 and 3, can include a micro-LED chip (μLED chip) as a light emitting device EL (see FIG. 4). A plurality of micro-LED chips (μLED chip) can include red chips (μLED chip_R), green chips (μLED chip_G), and blue chips (μLED chip_B), which are disposed on a thin film transistor (TFT) backplane. A red (R) pixel can include a red chip (μLED chip_R) as a light emitting device EL, a green (G) pixel can include a green chip (μLED chip_G) as a light emitting device EL, and a blue (B) pixel can include a blue chip (μLED chip_B) as a light emitting device EL.

The micro-LED chips (μLED chip) can be transferred from R/G/B donors, and thus, can be mounted on a TFT backplane. The red chips (μLED chip_R) can be transferred from an R donor, the green chips (μLED chip_G) can be transferred from a G donor, and the blue chips (μLED chip_B) can be transferred from a B donor. Transfer technology can use an electrostatic force, a laser, a speed-dependent tacky force, and a load-dependent tacky force. The transfer technology is not limited thereto and can use self-assembly based on an electrostatic force.

The TFT backplane may be implemented in an active matrix structure for efficient driving. In the TFT backplane, the pixels 101 may be defined by the data lines DL, the gate lines GL, and the power lines intersecting with each other.

The plurality of pixels 101 may constitute one unit pixel. For example, R, G, and B pixels arranged adjacent to each other may constitute one unit pixel in an extension direction of the gate line GL or an extension direction of the data line DL.

In FIGS. 1, D1 to D3 illustrated in a circle can be data lines, and Gn-2 to Gn can be gate lines. Each of the pixels 101 of FIG. 1 can include a same pixel circuit. The pixel circuit can be implemented with a driving element, one or more switch elements, and one or more capacitors.

Touch sensors can be disposed on the display panel 100. The touch sensors can be implemented as on-cell or add-on type touch sensors which are arranged on the screen AA of the display panel 100, or can be implemented as in-cell type touch sensors embedded in the pixel array. A touch input can be sensed through the touch sensors, or can be sensed through only pixels even without touch sensors.

A display panel driver can include a source driver 110 and a gate driver 120. The display panel driver can write the image data DATA in the pixels 101 of the display panel 100, based on control by a timing controller 130.

The source driver 110 can convert the image data DATA, received from the timing controller 130, into gamma compensation voltages by using a digital-to-analog converter (DAC) to generate data voltages. The source driver 110 can supply the data voltages to the data lines DL. The data voltages can be supplied to the data lines DL and can be applied to the driving elements through the switch elements of the pixels 101. The source driver 110 can be implemented with one or more source driving integrated circuits (ICs). The source driving IC can further include a touch driver which generates a touch sensor driving signal and converts a charge variation of a touch sensor into touch raw data.

A gate driver 120 can be provided in a bezel region BZ which is outside a screen and does not display an image on the display panel 100. The gate driver 120 can sequentially supply a gate signal, synchronized with data voltages, to the gate lines GL according to control by the timing controller 130. The gate signal can simultaneously activate pixel lines into which the data voltages are charged. The gate driver 120 can output the gate signal by using one or more shift registers and can shift the gate signal. The gate signal can include one or more scan signals and an emission control signal.

The timing controller 130 can receive the image data DATA and a timing signal, synchronized with the image data DATA, from a host system. The timing signal can include a vertical synchronization signal Vsync, a horizontal synchronization signal Hsync, a clock signal DCLK, and a data enable signal DE. The vertical synchronization signal Vsync can define a vertical period (i.e., one frame period). The horizontal synchronization signal Hsync can define a horizontal period. The data enable signal DE can define a time for which the image data DATA is transferred in the vertical period or the horizontal period.

An active period and a blank period of one vertical period can be further defined by the data enable signal DE. In the active period, the data enable signal DE can swing between a logic high voltage and a logic low voltage. On the other hand, in the blank period, the data enable signal DE can continuously maintain a logic low voltage.

The timing controller 130 can generate a source timing control signal DDC for controlling an operation timing of the source driver (or data driver) 110 and a gate timing control signal GDC for controlling an operation timing of the gate driver 120, based on the timing signal Vsync, Hsync, and DE received from the host system.

An input frame frequency (i.e., an input scan rate) synchronized with the image data DATA can vary over time. In this case, the timing controller 130 can drive the pixels 101 at various refresh rates. The timing controller 130 can drive the pixels 101 in a variable refresh rate (VRR) mode. A refresh rate can be referred to as a frame frequency.

In the VRR mode, the timing controller 130 can vary a length of a blank period on the basis of an input frame frequency with a length of an active period being fixed. For example, the timing controller 130 can control the blank period to a first length in a first input frame frequency and can control the blank period to a second length, which is longer than the first length, in a second input frame frequency which is lower than the first input frame frequency.

The timing controller 130 can set a highest frame frequency of input frame frequencies, varying over time, to a reference frame frequency in the VRR mode and can fix a driving frame frequency of the display panel 100 to the reference frame frequency, thereby decreasing the recognition of flickers occurring in changing the input frame frequency.

The host system be one of a television (TV), a set-top box, a navigation system, a personal computer (PC), a home theater, an automotive display system, a mobile device, and a wearable device. In the mobile device and the wearable device, the source driver 110, the timing controller 130, and a level shifter 140 can be integrated into one driving IC.

The level shifter 140 can convert a voltage of the gate timing control signal GDC, output from the timing controller 130, into a gate on voltage or a gate off voltage and can supply the gate on voltage or the gate off voltage to the gate driver 120. A logic off voltage of the gate timing control signal GDC can be converted into the gate off voltage, and a logic on voltage of the gate timing control signal GDC can be converted into the gate on voltage.

The timing controller 130 can transfer the image data DATA to the source driver 110 through an internal interface circuit. The internal interface circuit can be implemented as an embedded clock point to point interface (EPI), but is not limited thereto.

FIG. 4 is an example of an equivalent circuit diagram of each pixel 101 included in the display panel 100 of FIG. 1.

Referring to FIG. 4, the pixel 101 can include a light emitting device EL, a driving element DT, and a node circuit.

The node circuit can be an internal compensation circuit which is connected with a data line DL, first to third gate lines GLa, GLb, and GLc, and a plurality of power lines. The node circuit can sample a threshold voltage of the driving element DT to reflect a gate-source voltage of the driving element DT, and thus, can compensate for a driving current flowing in the driving element DT so as not to be affected by the degree of shift of threshold voltage of the driving element DT. The node circuit can include first to sixth switch elements T1 to T6, a first capacitor C1, and a storage capacitor Cst.

The driving element DT and the first to sixth switch elements T1 to T6 can each be implemented as a thin film transistor (TFT). All or some of transistors DT and T1 to T6 can each be a P-type TFT or an N-type TFT. Further, the N-type TFT can be an oxide TFT, and the P-type TFT can be a polycrystalline silicon TFT.

The driving element DT can be a driving element which generates the driving current, based on the gate-source voltage thereof. A gate electrode of the driving element DT can be connected with a gate node NG, a source electrode of the driving element DT can be connected with a source node NS, and a drain electrode of the driving element DT can be connected with a drain node ND.

The light emitting device EL can emit light having intensity corresponding to the driving current input from the driving element DT. The light emitting device EL can be implemented as a micro-LED including an inorganic emission layer, but is not limited thereto. The light emitting device EL can be implemented as an organic light emitting diode (OLED) including an organic emission layer. An anode electrode of the light emitting device EL can be connected with an input terminal of a high level driving voltage VDD, and a cathode electrode of the light emitting device EL can be connected with the source node NS.

The first switch element T1 can connect the data line DL with a first node N1, based on a first scan signal S(n). The first switch element T1 can include a gate electrode connected with the first gate line GLa, a source electrode connected with the data line DL, and a drain electrode connected with the first node N1.

The second switch element T2 can connect the gate node NG with the drain node ND, based on the first scan signal S(n). The second switch element T2 can include a gate electrode connected with the first gate line GLa, a source electrode connected with the drain node ND, and a drain electrode connected with the gate node NG.

The third switch element T3 can connect the first node N1 with an input terminal of a reference voltage Vref, based on an emission control signal EM. The third switch element T3 can include a gate electrode connected with the third gate line GLc, a source electrode connected with the first node N1, and a drain electrode connected with the input terminal of the reference voltage Vref.

The fourth switch element T4 can connect the drain node ND with an input terminal of a low level driving voltage VSS, based on the emission control signal EM. The fourth switch element T4 can include a gate electrode connected with the third gate line GLc, a source electrode connected with the drain node ND, and a drain electrode to which the low level driving voltage VSS is input.

The fifth switch element T5 can connect the drain node ND with the input terminal of the reference voltage Vref, based on the second scan signal S(n−1). The fifth switch element T5 can include a gate electrode connected with the second gate line GLb, a source electrode connected with the drain node ND, and a drain electrode to which the reference voltage Vref is input.

The sixth switch element T6 can connect the source node NS with an input terminal of the high level driving voltage VDD, based on the first scan signal S(n). For example, the sixth switch element T6 can short-circuit the anode electrode and the cathode electrode of the light emitting device EL, based on the first scan signal S(n). The sixth switch element T6 can include a gate electrode connected with the first gate line GLa, a source electrode connected with the anode electrode, and a drain electrode connected with the cathode electrode.

The first capacitor C1 can be connected with the anode electrode and the cathode electrode of the light emitting device EL. Further, the storage capacitor Cst can be connected with the first node N1 and the gate node NG.

Figure 5:
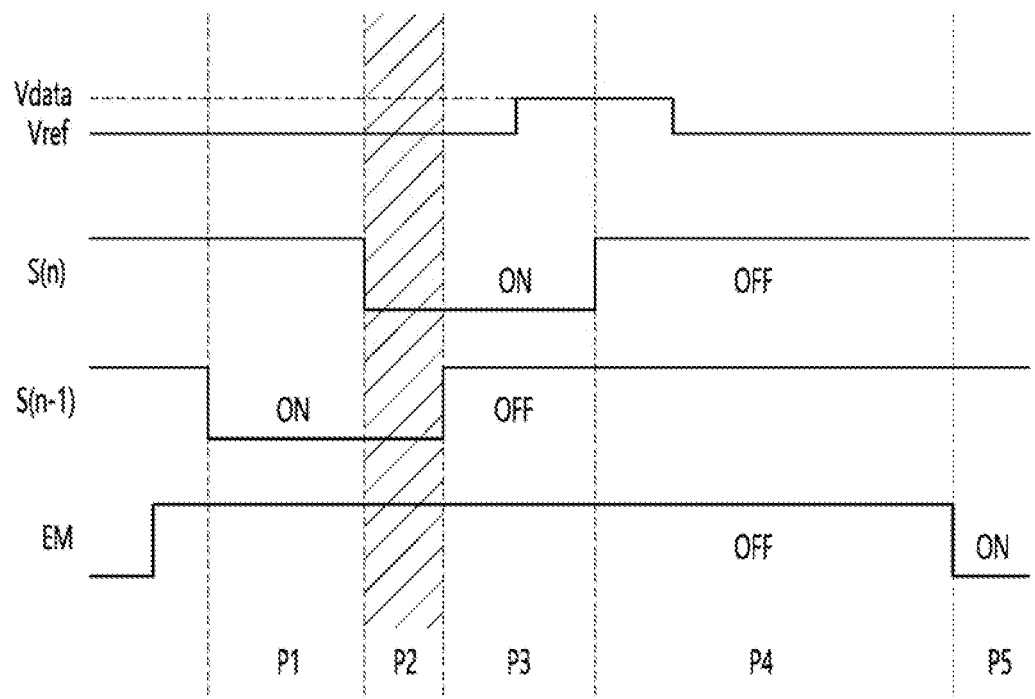
FIG. 5 is a driving waveform diagram of the pixel illustrated in FIG. 4.

FIG. 5 is an example of a driving waveform diagram of the pixel 101 illustrated in FIG. 4.

Referring to FIG. 5, a first frame for driving pixels 101 can include an active period and a blank period. The active period can include an initialization period P1, a threshold voltage sampling period P2, a data programming period P3, a holding period P4, and a portion of an emission period P5. The blank period can include the other emission period P5.

In the initialization period P1, the fifth switch element T5 can be turned on, and thus, the drain node ND can be initialized to the reference voltage Vref.

In the threshold voltage sampling period P2, the driving element DT and the fifth and sixth switch elements T5 and T6 may be turned on, and thus, the input terminal of the high level driving voltage VDD may be connected with the input terminal of the reference voltage Vref. In the threshold voltage sampling period P2, the second switch element T2 may be turned on, and thus, the gate node NG and the drain node ND may be short-circuited, whereby a voltage (VDD+Vth) of the drain node ND of the driving element may be sampled, and stored in the gate node NG.

In the data programming period P3, the first switch element T1 can be turned on, and thus, a voltage of the first node N1 can be changed from the reference voltage Vref to a data voltage Vdata. Further, a voltage of the gate node NG can vary by a changed voltage "Vdata−Vref". A voltage of the gate node NG can be "VDD+Vth−(Vdata−Vref)". In the data programming period P3, the sixth switch element T6 can be turned on, and thus, a voltage of the source node NS can be the high level driving voltage VDD.

In the holding period P4, all of the switch elements T1 to T6 can be turned off, and thus, a voltage of the gate node NG and a voltage of the source node NS can be maintained to be equal to the data programming period P3.

In the emission period P5, the fourth switch element T4 can be turned on by the emission control signal EM, and thus, the driving current can flow in the driving element DT. A level of the driving current can be irrelevant to a threshold voltage Vth and can be proportional to the square of "Vdata−Vref". The light emitting device EL can emit light with the driving current.

The emission control signal EM can be applied at an off level in the initialization period P1, the threshold voltage sampling period P2, the data programming period P3, and the holding period P4 and can be applied at an on level in the emission period P5.

The amount of light emitted from the light emitting device EL can be proportional to a level of the driving current, and thus, the amount of light emitted from the pixel 101 can be defined as being controlled based on a data voltage Vdata.

In P2 of FIG. 5 included in an active period ACT, the reference voltage Vref can be increased and maintained to be higher than a default level due to the short circuit of the high level driving voltage VDD and the reference voltage Vref, and then, can be recovered to the default level in the blank period BLK. A level of the driving current for determining the amount of light emitted from the light emitting device EL can be proportional to the square of "Vdata−Vref", and thus, in each frame, an average luminance of the active period ACT can be lower than an average luminance of the blank period BLK.

In other words, in the active period ACT, the reference voltage Vref can more increase than the default level due to a collision between the high level driving voltage VDD and the reference voltage Vref in the middle of data addressing (for example, P2 of FIG. 5). In the blank period BLK, the reference voltage Vref can be recovered to the default level. Accordingly, the average luminance of the active period ACT can be lower than the average luminance of the blank period BLK.

Figure 6:
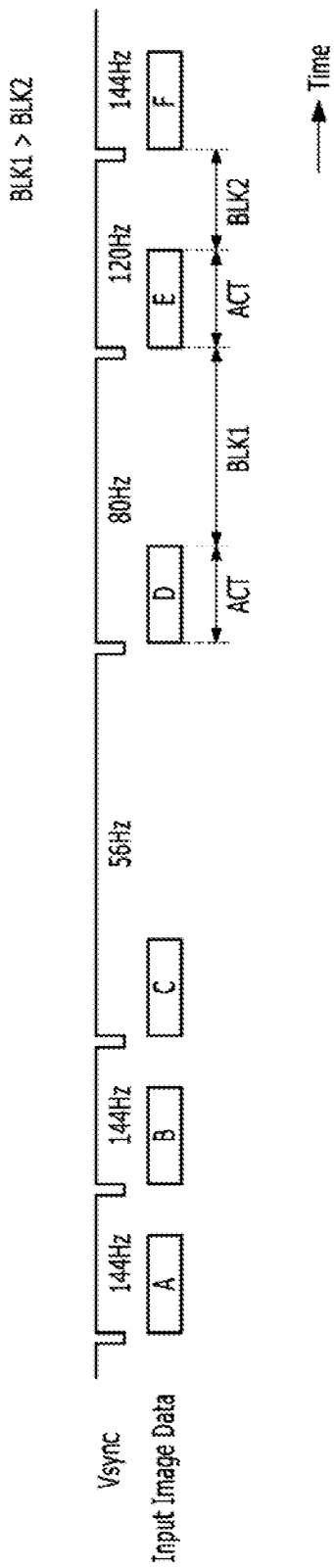
FIG. 6 is a diagram illustrating an operation of a variable refresh rate (VRR) driving mode according to a comparative example.
Figures 7, 8:
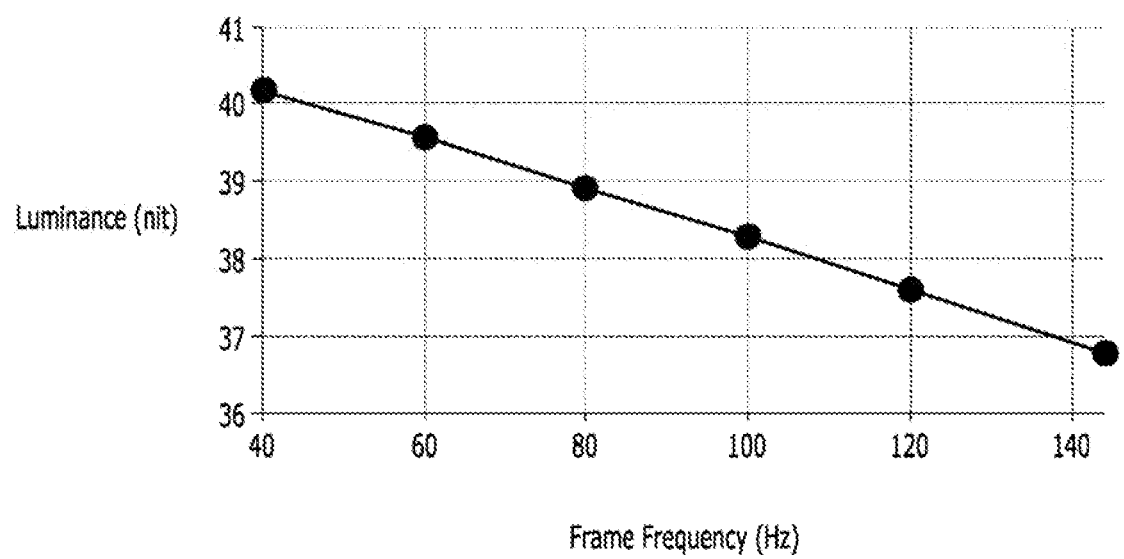
FIGS. 7 and 8 are diagrams illustrating an example where luminance implemented in a display panel is changed based on an input frame frequency.

FIG. 6 is a diagram illustrating an example of an operation of a VRR driving mode according to a comparative example. FIGS. 7 and 8 are diagrams illustrating an example where luminance implemented in a display panel is changed based on an input frame frequency.

Referring to FIG. 6, in a VRR mode, a length of an active period ACT can be fixed, and a length of a blank period can vary based on a frame frequency. For example, a length of the active period ACT in a first frame frequency of about 80 Hz can be the same as that of the active period ACT in a second frame frequency of about 120 Hz. However, a length of a first blank period BLK1 based on about 80 Hz can be set to be longer than that a second blank period BLK2 based on about 120 Hz.

Due to a luminance deviation between the active period ACT and the blank period BLK as in FIG. 5, an average luminance of one frame can increase as a length of the blank period BLK increases (i.e., an input frame frequency (i.e., an input scan rate) is lowered). For example, when the input frame frequency is about 144 Hz, 120 Hz, 100 Hz, 80 Hz, 60 Hz, and 40 Hz, an average luminance of one frame can be about 36.78 nit, 37.61 nit, 38.3 nit, 38.93 nit, 39.59 nit, and 40.23 nit, respectively.

As a result, when the input frame frequency is changed in the VRR mode, flickers which can be caused by a length deviation of the blank period BLK may be recognized.

Figure 9:
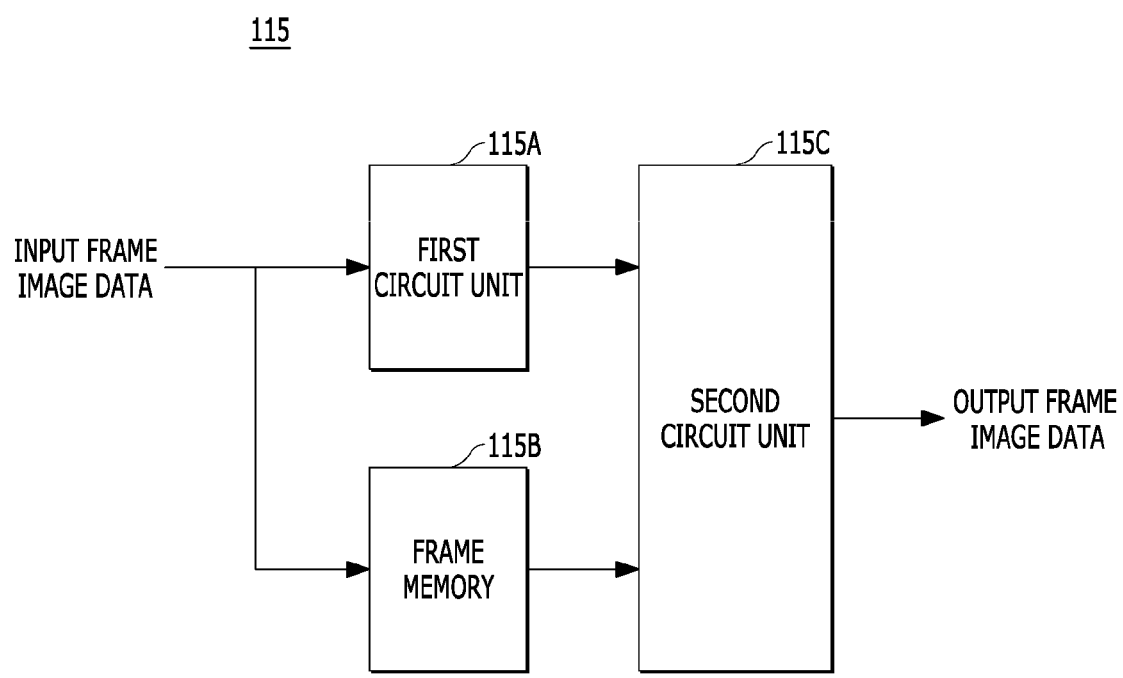
FIGS. 9 to 11 are diagrams illustrating a configuration and an operation of a flicker reduction device according to the present embodiment of the present disclosure.
Figure 10:
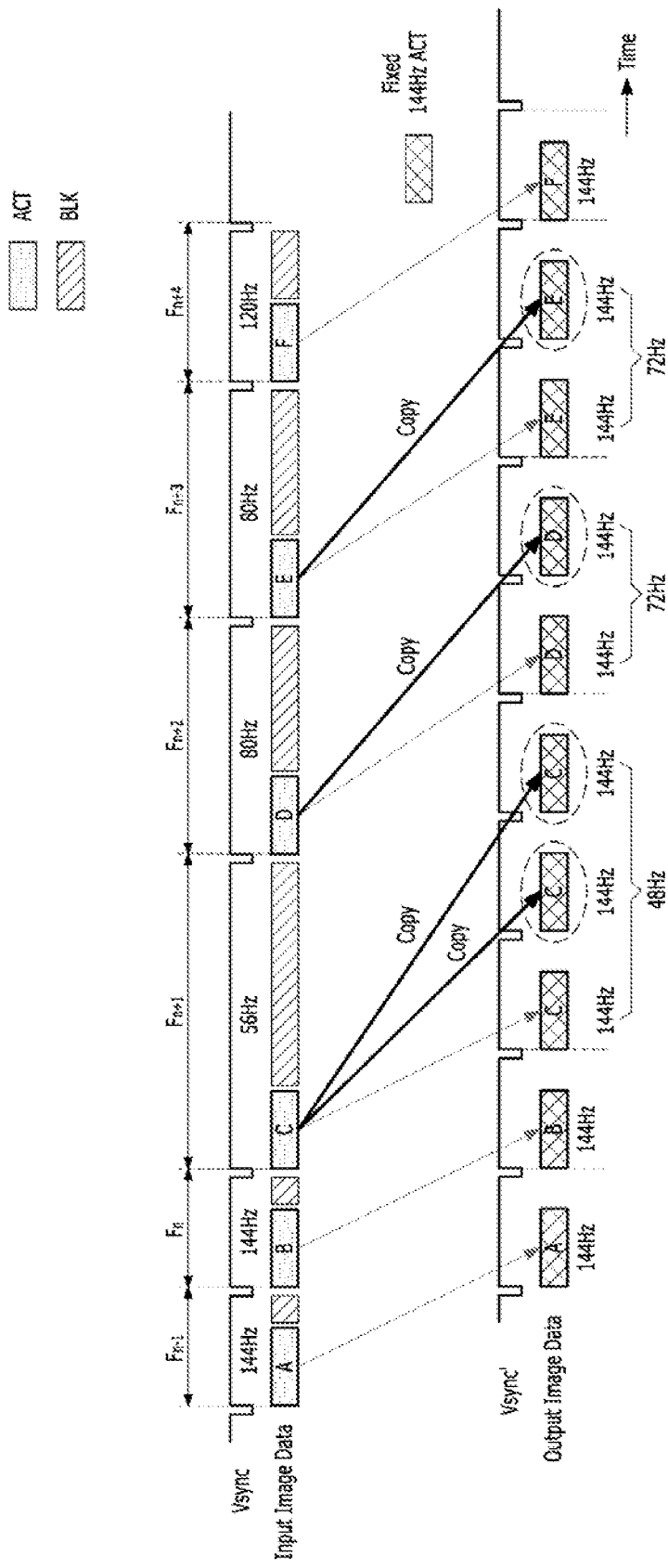
Figure 11:
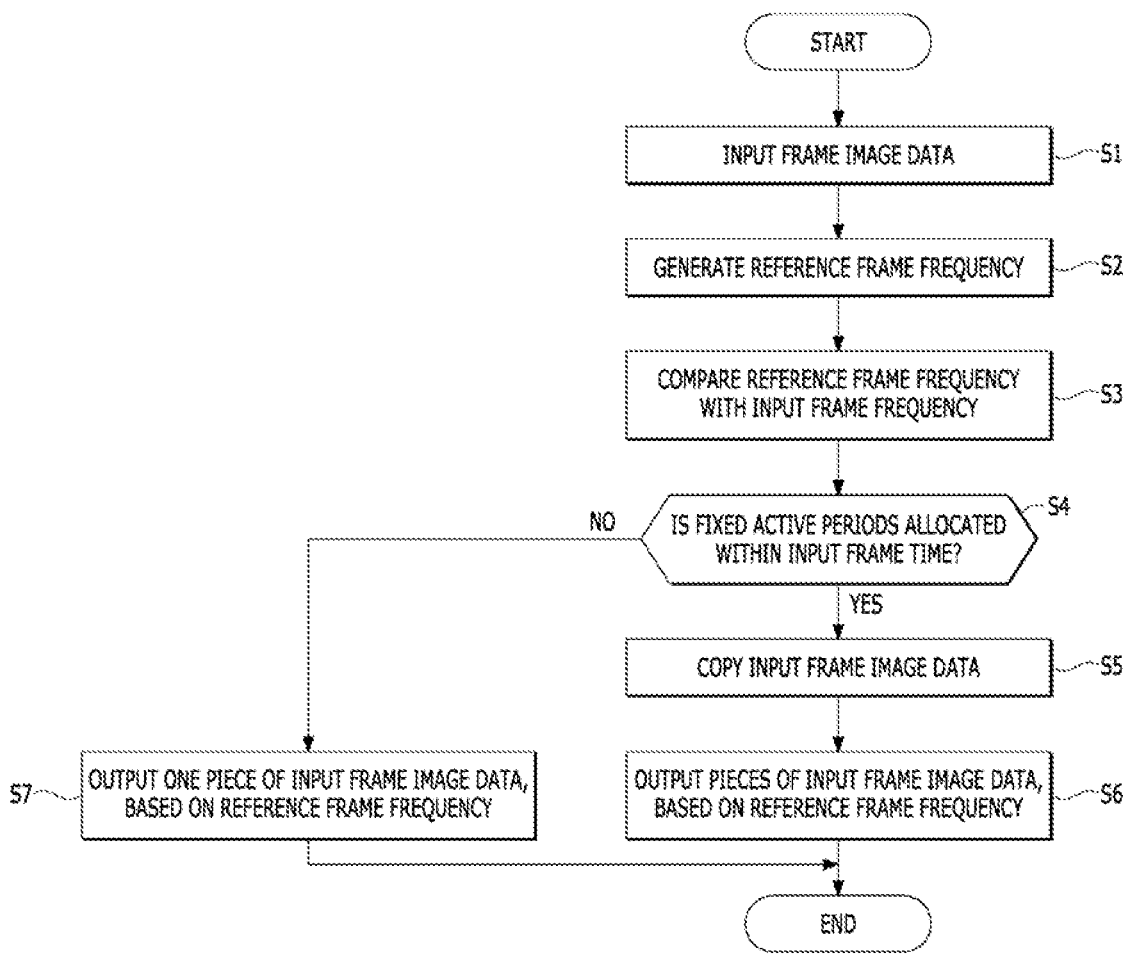

FIGS. 9 to 11 are diagrams illustrating a configuration and an operation of a flicker reduction device 115 according to the present embodiment of the present disclosure.

The flicker reduction device 115 according to the present embodiment can be embedded in the timing controller 130 of FIG. 1, but is not limited thereto. The flicker reduction device 115 according to the present embodiment can be mounted on a control printed circuit board (PCB) independently of the timing controller 130.

Referring to FIGS. 9 to 11, even when an input frame frequency is changed over time, the flicker reduction device 115 can fix an output frame frequency to a reference frame frequency to decrease the recognition of flickers. To this end, the flicker reduction device 115 can include a first circuit unit 115A, a frame memory 115B, and a second circuit unit 115C.

The frame memory 115B may sequentially store, in the unit of one frame, pieces of image data A to F which are sequentially input through continuous input frames $F_{n-1}$ to $F_{n+4}$. The input frame frequency synchronized with the input frames $F_{n-1}$ to $F_{n+4}$ can vary over time. For example, $n-1^{th}$ and $n^{th}$ input frames $F_{n-1}$ and $F_n$ can include the image data A and B synchronized with about 144 Hz, an $n+1^{th}$ input frame $F_{n+1}$ can include the image data C synchronized with about 56 Hz, $n+2^{th}$ and n+3th input frames $F_{n+2}$ and $F_{n+3}$ can include the image data D and E synchronized with about 80 Hz, and an n+4th input frame $F_{n+4}$ can include the image data F synchronized with about 120 Hz.

Each of the input frames $F_{n-1}$ to $F_{n+4}$ can include an active period corresponding to one of the image data A to F and a blank period which does not correspond to one of the image data A to F. Lengths of the active period can be set to be equal to one another in all of the input frames $F_{n-1}$ to $F_{n+4}$ regardless of the input frame frequency, and as the input frame frequency is lowered, a length of the blank period can be set to be longer.

The first circuit unit 115A can set a highest frame frequency (for example, 144 Hz) of input frame frequencies having various levels, previously set for implementing the VRR driving mode, to a reference frame frequency and can fix an output frame frequency to the reference frame frequency (S1, S2). To this end, the first circuit unit 115A can synchronize a vertical synchronization signal Vsync, synchronized with the input frame frequency, with the reference frame frequency to modulate the vertical synchronization signal Vsync, and thus, can generate a modulated vertical synchronization signal Vsync'. Based on the modulated vertical synchronization signal Vsync', the output frame frequency can be fixed to the reference frame frequency.

The first circuit unit 115A can compare each input frame frequency with the reference frame frequency (S3). When a plurality of fixed active periods based on the reference frame frequency are allocated within each input frame time corresponding to the input frame frequency, the first circuit unit 115A can output a first control signal, and when only one fixed active period is allocated within each input frame time, the first circuit unit 115A can output a second control signal (S4). For example, the first circuit 115A may compare the input frame frequency with the reference frame frequency, and output a first control signal or a second control signal according to a result of comparing. When the input frame frequency is 72 Hz, the input frame time corresponding to the input frame frequency is 1/72 sec and when the reference frame frequency is 144 Hz, the reference frame time corresponding to the reference frame frequency is 1/144 sec. In this case, the input frame time corresponding to the input frame frequency is two times as a reference frame time corresponding to the reference frame frequency, the first circuit output the first control signal. Correspondingly, the second circuit unit 115C may copy image data of the input frame twice according to the first control signal and the comparing result, and may output two image data of the input frames. In this case, the output frame time is equal to the input frame time.

For example, the first circuit unit 115A can output the first control signal, based on each of the $n+2^{th}$ and $n+3^{th}$ input frames $F_{n+2}$ and $F_{n+3}$ of about 80 Hz and the $n+1^{th}$ input frame $F_{n+1}$ of about 56 Hz, and can output the second control signal, based on each of the $n-1^{th}$ and $n^{th}$ input frames $F_{n-1}$ and $F_n$ of about 144 Hz and the $n+4^{th}$ input frame $F_{n+4}$ of about 120 Hz.

The second circuit unit 115C can copy image data of each input frame on the basis of the first control signal and can output image data of a plurality of input frames according to the reference frame frequency. The second circuit unit 115C can repeatedly output copied image data of the input frame multiple times according to the reference frame frequency (S5, S6).

For example, the second circuit unit 115C can copy the image data C of the $n+1^{th}$ input frame $F_{n+1}$ of about 56 Hz, based on about 144 Hz, and can output three pieces of image data C constituting the $n+1^{th}$ input frame $F_{n+1}$ three times, based on about 144 Hz. Further, the second circuit unit 115C can copy the image data D of the $n+2^{th}$ input frame $F_{n+2}$ of about 80 Hz, based on about 144 Hz, and can output two pieces of image data D constituting the $n+2^{th}$ input frame $F_{n+2}$ twice, based on about 144 Hz. Further, the second circuit unit 115C can copy the image data E of the $n+3^{th}$ input frame $F_{n+3}$ of about 80 Hz, based on about 144 Hz, and can output two pieces of image data E constituting the $n+3^{th}$ input frame $F_{n+3}$ twice, based on about 144 Hz.

The second circuit unit 115C may not copy image data of each input frame on the basis of the second control signal. The second circuit unit 115C can output non-copied image data of the input frame once according to the reference frame frequency (S7).

For example, the second circuit unit 115C can output the image data A of the $n-1^{th}$ input frame $F_{n-1}$ of about 144 Hz once, based on about 144 Hz, can output the image data B of the $n^{th}$ input frame $F_n$ of about 144 Hz once, based on of the $n^{th}$ input frame $F_n$ of about 144 Hz once, based on about 144 Hz, and can output the image data F of the $n+4^{th}$ input frame $F_{n+4}$ of about 120 Hz once, based on about 144 Hz.

Furthermore, when the reference frame frequency is an integer multiple of the input frame frequency, the second circuit unit 115C can perform control so that an output frame time is equal to an input frame time. On the other hand, when the reference frame frequency is a non-integer multiple of the input frame frequency, the second circuit unit 115C can perform control so that the output frame time differs from the input frame time. That is, the second circuit output a plurality of image data of the input frame so that an output frame time close to the input frame time. For example, when the input frame frequency is 42 Hz, the input frame time corresponding to the input frame frequency is 1/42 sec and when the reference frame frequency is 144 Hz, the reference frame time corresponding to the reference frame frequency is 1/144 sec. In this case, the input frame time corresponding to the input frame frequency is about 3.4 times as a reference frame time corresponding to the reference frame frequency, the first circuit output the first control signal. Correspondingly, the second circuit unit 115C may copy image data of the input frame three or four times according to the first control signal and the comparing result, and may output three or four image data of the input frames. In this case, the output frame time is close to the input frame time.

For example, the second circuit unit 115C can perform control so that an output frame time (1 sec/144) is equal to an input frame time (1 sec/144), in each of the n−1$^{th}$ and n$^{th}$ input frames $F_{n-1}$ and $F_n$ where the reference frame frequency is equal to the input frame frequency. The second circuit unit 115C can perform control so that an output frame time (1 sec/48) is longer than an input frame time (1 sec/56), in the n+1$^{th}$ input frame $F_{n+1}$ where the reference frame frequency is a non-integer multiple of the input frame frequency. The second circuit unit 115C can perform control so that an output frame time (1 sec/72) is longer than an input frame time (1 sec/80), in each of the n+2$^{th}$ and n+3$^{th}$ input frames $F_{n+2}$ and $F_{n+3}$ where the reference frame frequency is a non-integer multiple of the input frame frequency. The second circuit unit 115C can perform control so that an output frame time (1 sec/144) is shorter than an input frame time (1 sec/120), in the n+4$^{th}$ input frame $F_{n+4}$ where the reference frame frequency is a non-integer multiple of the input frame frequency.

Figure 12:
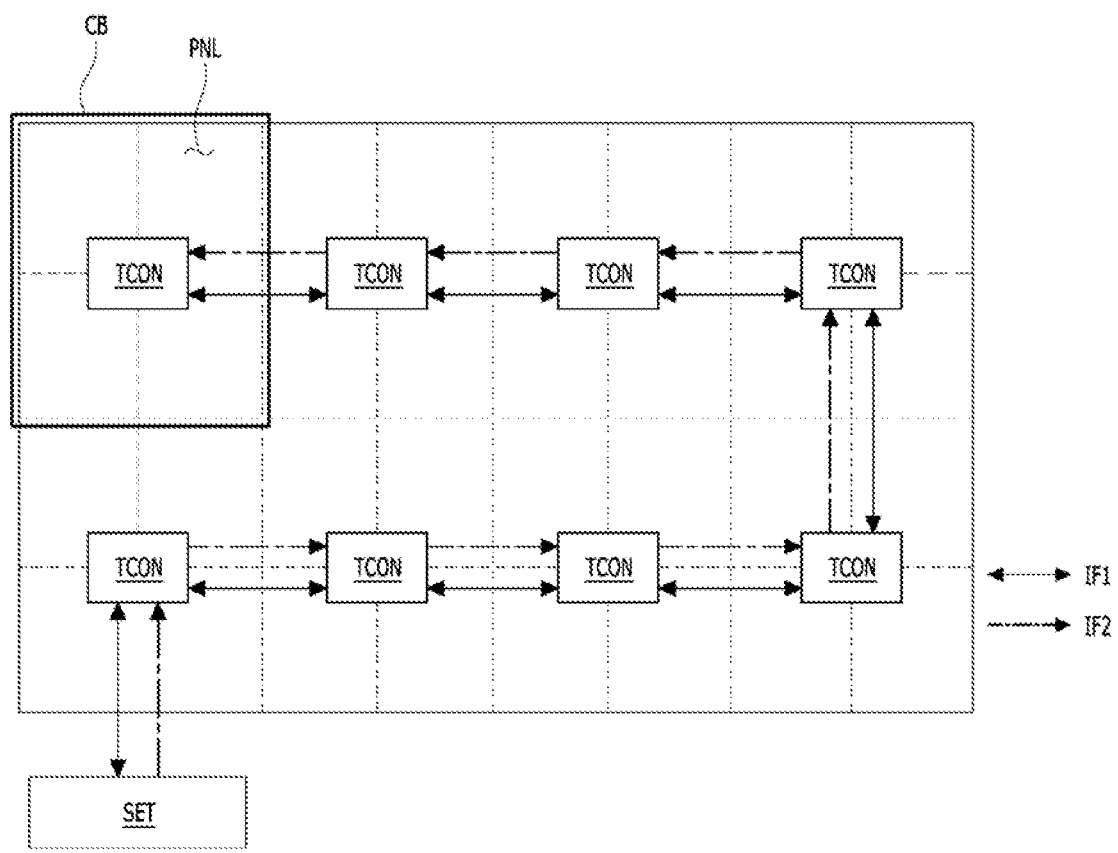
FIG. 12 is a diagram schematically illustrating a tiling display apparatus according to an embodiment of the present disclosure.
Figure 13:
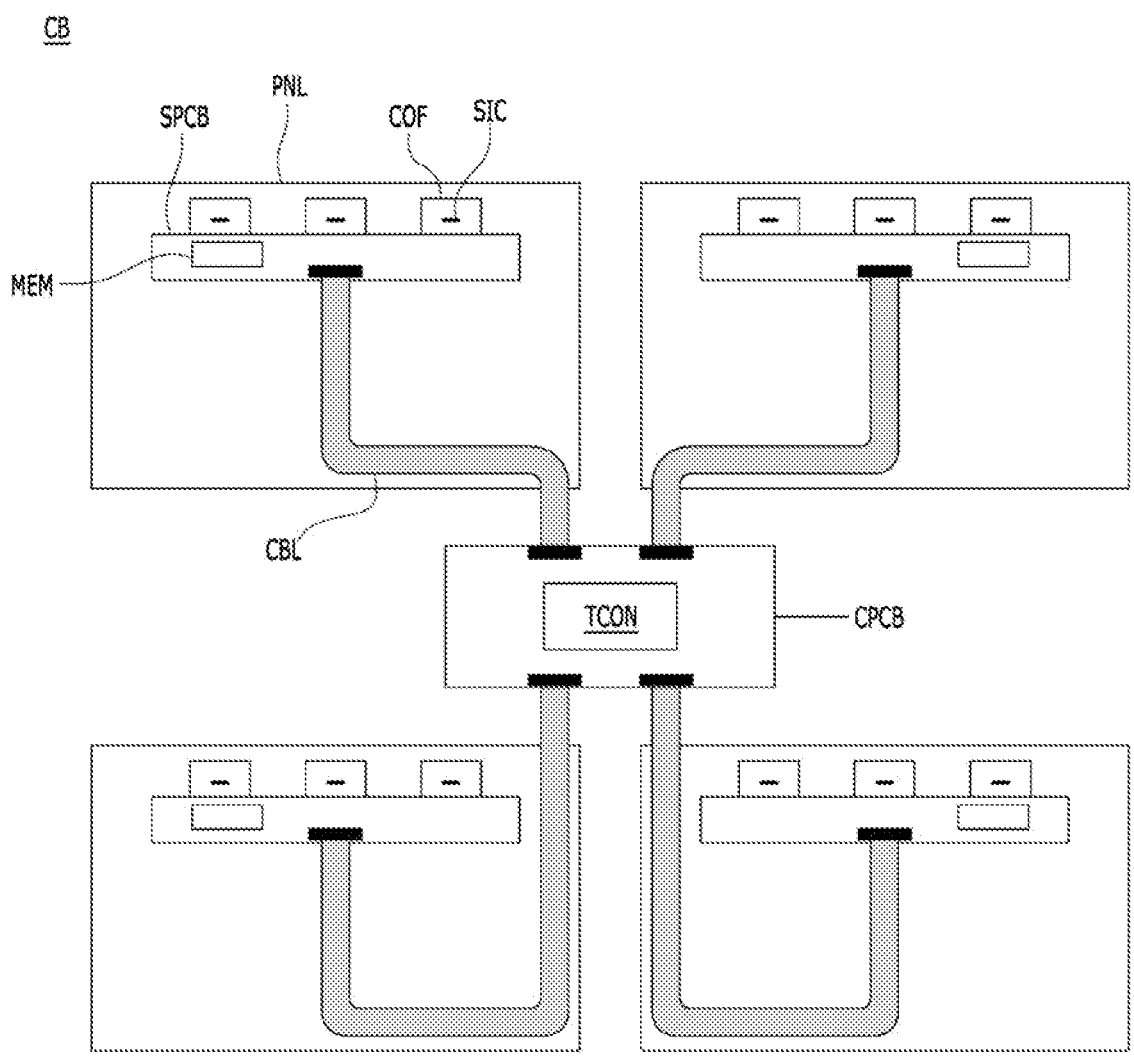
FIG. 13 is a diagram illustrating a connection configuration of a display module illustrated in FIG. 12.
Figure 14:
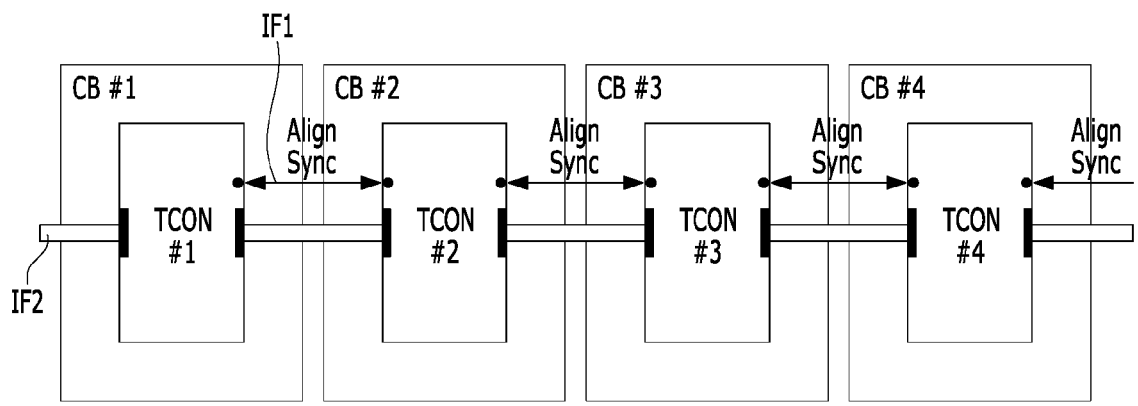
FIG. 14 is a diagram illustrating an align feedback structure between display modules according to an embodiment of the present disclosure.

FIG. 12 is a diagram schematically illustrating a tiling display apparatus 1000 according to an embodiment of the present disclosure. FIG. 13 is a diagram illustrating a connection configuration of a display module illustrated in FIG. 12. FIG. 14 is a diagram illustrating an align feedback structure between display modules according to an embodiment of the present disclosure.

Referring to FIGS. 12 to 14, the tiling display apparatus 1000 according to the embodiment of the present disclosure can include a system chip SET and a plurality of display modules CB. Each of the display modules CB can include a plurality of display panels PNL. The display module CB can be referred to as a cabinet.

The display modules CB can be connected with one another through an interface circuit to configure a tiling screen. A total resolution of the tiling screen can be determined as a total sum of module resolutions implemented in the display modules CB. For example, in a case where a tiling screen is configured by eight display modules CB having a module resolution of 960(width)*1080(height), a total resolution of the tiling screen can be 3840(width)*2160 (height).

The display modules CB and CB #1 to CB #4 can be connected with one another through a bidirectional first interface circuit IF1 based on a bidirectional serial communication scheme, so as to execute a target operation corresponding to a control command signal input from the system chip SET. The bidirectional first interface circuit IF1 can be implemented as a bidirectional multi-chain interface of a feedback loop type between adjacent display modules CB. Individual bidirectional serial communication between display modules CB can be performed by the bidirectional first interface circuit IF1, and thus, a short communication line can be secured and the speed and reliability of large-capacity data communication based on a short communication line can be enhanced. The bidirectional first interface circuit IF1 can be implemented as a dual serial peripheral interface (SPI), but is not limited thereto.

The system chip SET can sequentially transfer image data, which is to be divisionally displayed through the display modules CB, to the display modules CB through a second interface circuit IF2. The second interface circuit IF2 can be implemented based on a V-by-One (Vx1) scheme capable of high-speed and large-capacity interfacing, but is not limited thereto.

Each display module CB can include a plurality of display panels PNL, panel driving circuits for driving the display panels PNL, and a timing controller TCON which controls an operation timing of each of the panel driving circuits.

Each of the display panels PNL can be implemented as a micro light emitting diode (micro LED)-based electroluminescent display type, but is not limited thereto and can be implemented with light emitting devices including a micro-LED.

The timing controllers TCON included in the display modules CB and CB #1 to CB #4 can be connected with one another through the first and second interface circuits IF1 and IF2. The timing controller TCON of each display module CB can be mounted on a control printed circuit board (PCB) CPCB and can be connected to the panel driving circuits of a corresponding display module CB through a branch cable CBL.

The panel driving circuit can be individually connected to each of the plurality of display panels PNL configuring the same display module CB. The panel driving circuit can include a source PCB SPCB connected with the timing controller TCON through the branch cable CBL, a memory circuit MEM mounted on the source PCB SPCB, a conductive film COF electrically connecting the source PCB SPCB with the display panel PNL, a data driver SIC bonded on the conductive film COF, and a gate driver and a power circuit electrically connected to the source PCB SPCB.

The memory circuit MEM can be a non-volatile memory which stores a panel characteristic and can be flash memory and/or electrically erasable programmable read-only memory (EEPROM), which store(s) a correction value for gamma voltage, a first compensation value for compensating for a driving characteristic deviation/color deviation between pixels, a second compensation value for compensating for a boundary deviation between adjacent display panels PNL, various image qualities, and driving control data. In this case, a high amount of data can be stored in flash memory, and a low amount of data can be stored in EEPROM.

The timing controller TCON can operate the panel driving circuit on the basis of a control command signal transferred from the system chip SET through the first interface circuit IF1 to execute a target operation corresponding to the control command signal and can generate a control response signal including an execution result of the target operation. The target operation can include reset, mute (dark change), average picture level (APL) range change, gamma change, image quality compensation value update, and firmware update. The target operation can further include an operation of writing and storing control command data in a specific memory and an operation of reading control execution data from a specific memory.

The timing controller TCON can control an operation of the panel driving circuit so that division image data transferred through the second interface circuit IF2 is displayed on the display panels PNL.

Each of the display modules CB and CB #1 to CB #4 can include the flicker reduction device 115 described above with reference to FIGS. 9 to 11. The flicker reduction device 115 can be embedded in the timing controller TCON, but is not limited thereto. The flicker reduction device 115 can be mounted on the control PCB CPCB independently of the timing controller TCON.

Each of the display modules CB and CB #1 to CB #4 can further include an output synchronization device (see 125 of FIG. 15) which is connected with an output terminal of the flicker reduction device 115 and is activated in an abnormal rebooting operation to adjust a start timing of an output frame time.

Figure 15:
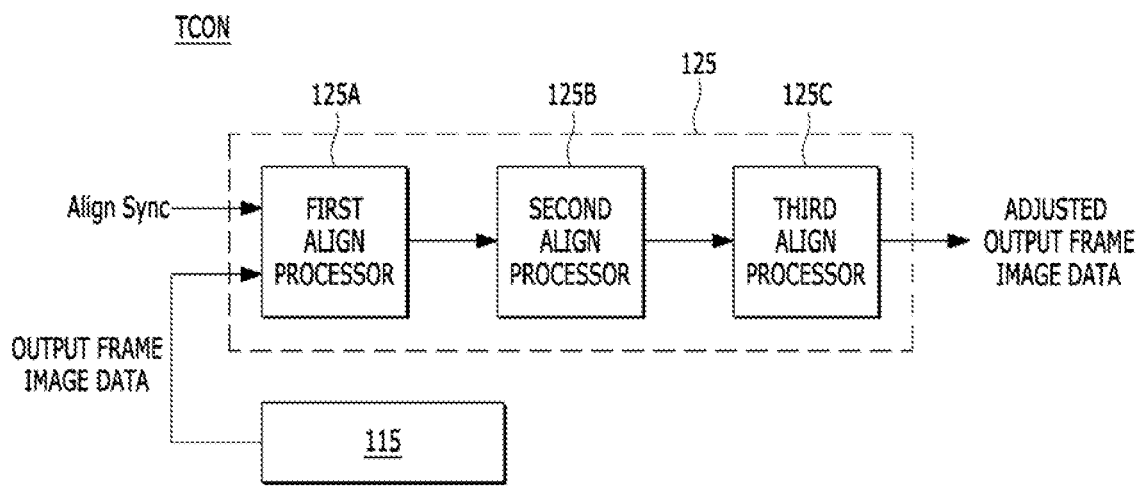
FIGS. 15 to 17 are diagrams illustrating a configuration and an operation of each of an output synchronization device and a flicker reduction device included in each display module according to an embodiment of the present disclosure.
Figure 16:
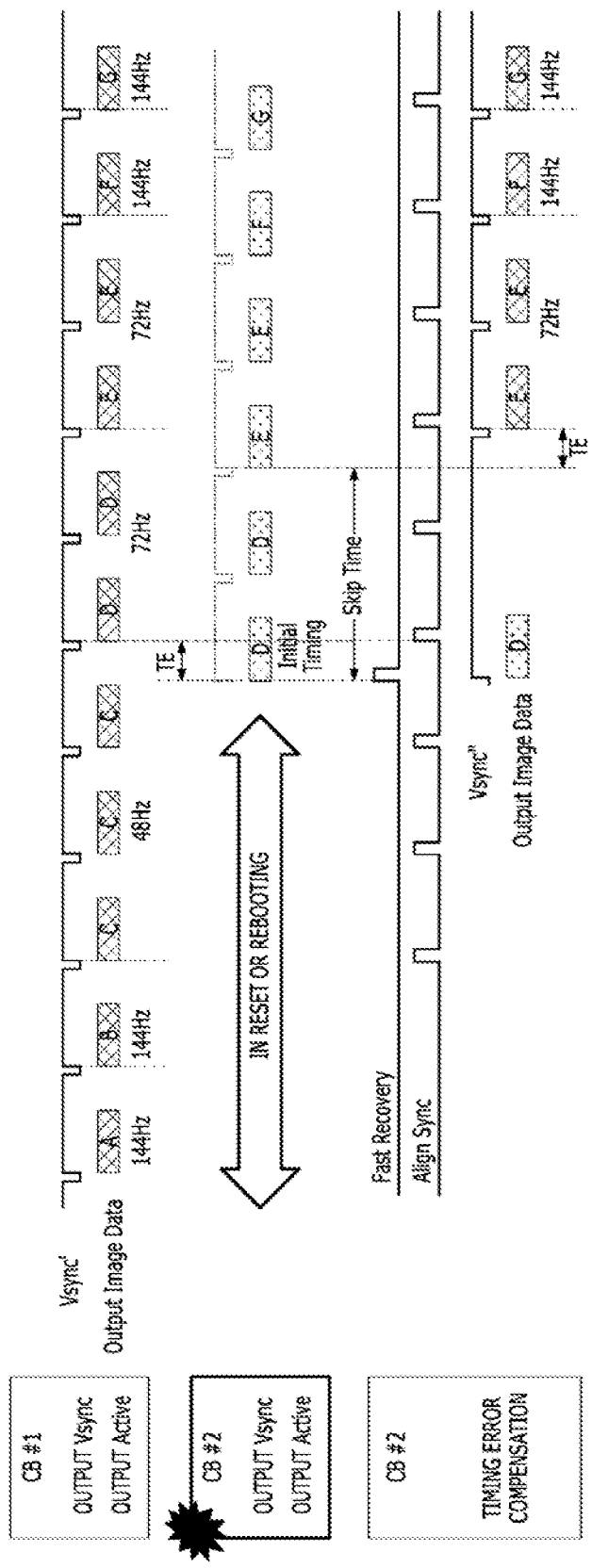
Figure 17:
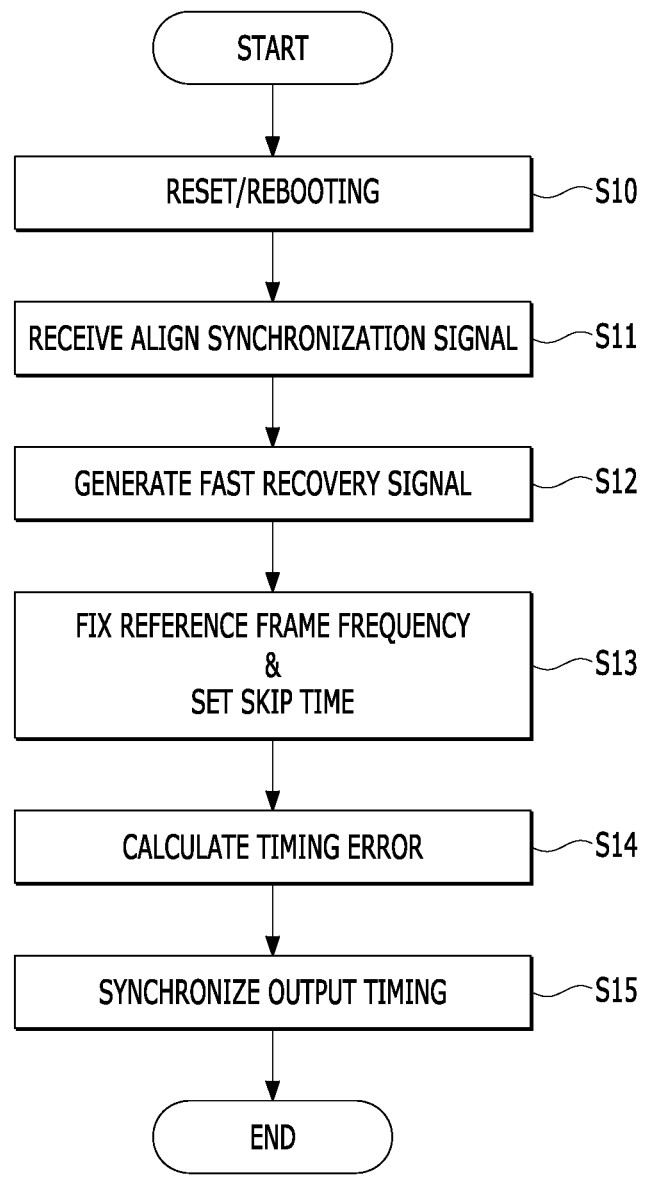

FIGS. 15 to 17 are diagrams illustrating a configuration and an operation of each of an output synchronization device 125 and a flicker reduction device 115 included in each display module according to an embodiment of the present disclosure.

The flicker reduction device 115 can be substantially the same as the descriptions of FIGS. 9 to 11.

Referring to FIGS. 15 to 17, the output synchronization device 125 can receive, as an input, an output of the flicker reduction device 115 in the VRR driving mode. When a display module (for example, CB #2 in FIG. 16) including the output synchronization device 125 is abnormally reset or rebooted, the output synchronization device 125 can adjust a start timing of an output frame time for outputting a division image, based on a fast recovery signal (Fast Recovery) generated thereby and an align synchronization signal (Align Sync) supplied from an adjacent display module CB #1 through the first interface circuit IF1, and thus, can decrease a partial output image deviation on a tiling screen.

To this end, the output synchronization device 125 can include a first align processor 125A, a second align processor 125B, and a third align processor 125C.

The first align processor 125A can set a skip time based on a reference frame frequency (for example, 144 Hz) in performing an abnormal rebooting operation, can synchronize the skip time with a start timing of the skip time to generate a fast recovery signal, and can receive the align synchronization signal from adjacent display modules (S10 to S13). The skip time can include one or more input frame times, but is not limited thereto.

The adjacent display modules can generate the align synchronization signal which is enabled at every reference frame time (1 sec/144) corresponding to the reference frame frequency and can transfer and receive the align synchronization signal therebetween, thereby synchronizing output timings of division images.

The second align processor 125B can calculate a timing error TE between the fast recovery signal and the align synchronization signal within a skip time (S14).

The third align processor 125C can synchronize a start timing of an output frame time, corresponding to a corresponding division image, with the align synchronization signal on the basis of the timing error TE (S15). As a result, an image output timing between a first display module CB #1 and a second display module CB #2 can match from the start timing of the output frame time. To this end, from the start timing of the output frame time, a modulated vertical synchronization signal Vsync' of the first display module CB #1 can be synchronized with a modulated vertical synchronization signal Vsync" of the second display module CB #2.

The present embodiments can realize the following effects.

In the flicker reduction device of the display apparatus according to the present embodiment, because an output frame frequency is fixed to a reference frame frequency, even when an input frame frequency is changed over time in the VRR driving mode, the recognition of flickers may decrease.

In the display apparatus according to the present embodiments, because each display module includes the flicker reduction device, the recognition of flickers can decrease in the VRR driving mode. Furthermore, even when one of a plurality of display modules can be abnormally reset or rebooted, a start timing of an output frame time corresponding to the rebooted display module can be synchronized with an align synchronization signal, and thus, the tiling display apparatus can decrease a partial output image deviation on a tiling screen.

The effects according to the present disclosure are not limited to the above examples, and other various effects can be included in the specification.

While the present disclosure has been particularly shown and described with reference to exemplary embodiments thereof, it will be understood by those of ordinary skill in the art that various changes in form and details can be made therein without departing from the spirit and scope of the present disclosure as defined by the following claims.

What is claimed is:

1. A flicker reduction device of a display apparatus, the flicker reduction device comprising:
    a frame memory configured to store image data of an input frame synchronized with an input frame frequency varying over time;
    a first circuit configured to output a first control signal when a plurality of fixed active periods based on a reference frame frequency are allocated within each input frame time corresponding to the input frame frequency, and output a second control signal when only one fixed active period is allocated within each input frame time; and
    a second circuit configured to copy the image data of the input frame according to the first control signal and output image data of a plurality of input frames according to the reference frame frequency, and configured to output the image data of the input frame according to the reference frame frequency without copying according to the second control signal, and
    wherein, when the reference frame frequency is an integer multiple of the input frame frequency, the second circuit performs control so that an output frame time is equal to the input frame time, and
    when the reference frame frequency is a non-integer multiple of the input frame frequency, the second circuit performs control so that the output frame time differs from the input frame time.

2. The flicker reduction device of claim 1, wherein a highest frame frequency of the input frame frequency, varying over time, is set as the reference frame frequency.

3. The flicker reduction device of claim 1, wherein the second circuit repeatedly outputs a plurality of image data of the input frame according to the reference frame frequency, and outputs a non-copied image data of the input frame according to the reference frame frequency.

4. A tiling display apparatus comprising:
    a plurality of display modules connected with one another to configure a tiling screen and divisionally display an input image; and
    a flicker reduction device included in each of the plurality of display modules,
    wherein the flicker reduction device comprises:
    a frame memory configured to store image data of an input frame synchronized with an input frame frequency varying over time;
    a first circuit configured to output a first control signal when a plurality of fixed active periods based on a reference frame frequency are allocated within each input frame time corresponding to the input frame frequency and output a second control signal when only one fixed active period is allocated within each input frame time; and a second circuit configured to copy the image data of the input frame according to the first control signal and output image data of a plurality of input frames according to the reference frame frequency, and configured to output the image data of the input frame according to the reference frame frequency without copying according to the second control signal, and wherein, when the reference frame frequency is an integer multiple of the input frame frequency, the second circuit performs control so that an output frame time is equal to the input frame time, and when the reference frame frequency is a non-integer multiple of the input frame frequency, the second circuit performs control so that the output frame time differs from the input frame time.

5. The tiling display apparatus of claim 4, wherein a highest frame frequency of the input frame frequency, varying over time, is set as the reference frame frequency.

6. The tiling display apparatus of claim 4, wherein the second circuit repeatedly outputs a plurality of image data of the input frame according to the reference frame frequency, and outputs a non-copied image data of the input frame once according to the reference frame frequency.

7. The tiling display apparatus of claim 4, wherein each of the plurality of display modules further comprises an output synchronization device connected with an output terminal of the flicker reduction device and activated in an abnormal rebooting operation to adjust a start timing of the output frame time.

8. The tiling display apparatus of claim 7, wherein the output synchronization device comprises:

a first align processor configured to set a skip time based on the reference frame frequency in performing the abnormal rebooting operation, synchronize the skip time with a start timing of the skip time to generate a fast recovery signal, and receive an align synchronization signal from adjacent display modules;

a second align processor configured to calculate a timing error between the fast recovery signal and the align synchronization signal within the skip time; and a third align processor configured to synchronize a start timing of the output frame time with the align synchronization signal, based on the timing error.

9. The tiling display apparatus of claim 8, wherein the align synchronization signal is enabled at every reference frame time corresponding to the reference frame frequency.

10. A flicker reduction device of a display apparatus, the flicker reduction device comprising:

a frame memory configured to store image data of an input frame synchronized with an input frame frequency;

a first circuit configured to compare the input frame frequency with a reference frame frequency, and output a first control signal or a second control signal according to a result of comparing; and a second circuit configured to output a plurality of image data of the input frame according to the first control signal, the reference frame frequency, and output an image data of the input frame according to the second control signal, wherein when an input frame time corresponding to the input frame frequency is two or more times larger than a reference frame time corresponding to the reference frame frequency, the first circuit output the first control signal, wherein the reference frame frequency is the highest frame frequency of the input frame frequency, and wherein, when the input frame time is an integer multiple of the reference frame time, the second circuit outputs a plurality of image data of the input frame so that an output frame time is equal to the input frame time, and when the input frame time is not an integer multiple of the reference frame time, the second circuit outputs a plurality of image data of the input frame so that an output frame time is close to the input frame time.

* * * * *